United States Patent
Kim et al.

(10) Patent No.: US 9,152,422 B2
(45) Date of Patent: Oct. 6, 2015

(54) APPARATUS AND METHOD FOR COMPRESSING TRACE DATA

(75) Inventors: Jae-Young Kim, Namyangju-si (KR); Dong-Hoon Yoo, Seoul (KR); Yeon-Gon Cho, Hwaseong-si (KR); Hee-Jun Shim, Seoul (KR); Chang-Moo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 373 days.

(21) Appl. No.: 13/177,823

(22) Filed: Jul. 7, 2011

(65) Prior Publication Data
US 2012/0185675 A1    Jul. 19, 2012

(30) Foreign Application Priority Data
Jan. 18, 2011  (KR) .................. 10-2011-0005141

(51) Int. Cl.
*G06F 9/44* (2006.01)
*G06F 9/30* (2006.01)
*G06F 11/36* (2006.01)

(52) U.S. Cl.
CPC ........ *G06F 9/30189* (2013.01); *G06F 9/30072* (2013.01); *G06F 11/3636* (2013.01)

(58) Field of Classification Search
CPC ........... G06F 11/3636; G06F 11/3471; G06F 11/323; G06F 17/30153; G06F 11/3612; G06F 2212/401
See application file for complete search history.

(56) References Cited

U.S. PATENT DOCUMENTS

| | | | |
|---|---|---|---|
| 6,681,353 B1 | 1/2004 | Barrow | |
| 7,058,937 B2 * | 6/2006 | Fu et al. | 717/161 |
| 7,330,809 B2 * | 2/2008 | Tabe | 703/23 |
| 7,496,902 B2 * | 2/2009 | Levine et al. | 717/128 |
| 7,543,186 B2 | 6/2009 | Schultz | |
| 7,770,156 B2 * | 8/2010 | Thekkath | 717/128 |
| 8,037,285 B1 * | 10/2011 | Thaik et al. | 712/211 |
| 8,069,335 B2 * | 11/2011 | Kievits et al. | 712/205 |
| 8,250,542 B1 * | 8/2012 | Ball | 717/128 |
| 2001/0054175 A1 * | 12/2001 | Watanabe | 717/4 |
| 2003/0196197 A1 * | 10/2003 | Fu et al. | 717/161 |
| 2004/0073838 A1 * | 4/2004 | Tabe | 714/29 |
| 2006/0225050 A1 * | 10/2006 | Thekkath | 717/128 |
| 2007/0006172 A1 * | 1/2007 | Swoboda et al. | 717/131 |
| 2007/0006174 A1 * | 1/2007 | Sohm et al. | 717/131 |
| 2007/0089095 A1 * | 4/2007 | Thekkath et al. | 717/128 |

(Continued)

FOREIGN PATENT DOCUMENTS

| | | |
|---|---|---|
| KR | 10-2003-0077475 | 10/2003 |
| KR | 10-2008-0076020 | 8/2008 |

OTHER PUBLICATIONS

Markus Peuhkuri ; A Method to Compress and Anonymize Packet Traces ; 2001 ACM; pp. 257-261; <http://dl.acm.org/citation.cfm?id=505233>.*

(Continued)

*Primary Examiner* — Thuy Dao
*Assistant Examiner* — Cuong V Luu
(74) *Attorney, Agent, or Firm* — NSIP Law (57) ABSTRACT

An apparatus and method for compressing trace data is provided. The apparatus includes a detection unit configured to detect trace data corresponding to one or more function units performing a substantially significant operation in a reconfigurable processor as valid trace data, and a compression unit configured to compress the valid trace data.

16 Claims, 6 Drawing Sheets

(56) References Cited

U.S. PATENT DOCUMENTS

| | | | |
|---|---|---|---|
| 2008/0256334 A1* | 10/2008 | Kievits et al. | 712/205 |
| 2009/0313460 A1* | 12/2009 | Huang et al. | 712/227 |
| 2010/0257510 A1* | 10/2010 | Horley et al. | 717/128 |
| 2011/0289485 A1* | 11/2011 | Mejdrich et al. | 717/128 |

OTHER PUBLICATIONS

Johan Moe et al.; Understanding Distributed Systems via Execution Trace Data; 2001 IEEE; pp. 60-67; <http://ieeexplore.ieee.org/stamp/stamp.jsp?tp=&arnumber=921714>.*

Steven R Reiss et al.; Generating Java Trace Data; 2000 ACM; pp. 71-77; <http://dl.acm.org/citation.cfm?id=337481>.*

Eric E. Johnson; PDATS Lossless Address Trace Compression for Reducing File Size and Access Time; 1994 IEEE; pp. 213-219; <http://citeseerx.ist.psu.edu/viewdoc/download?doi=10.1.1.53.709&rep=rep1&type=pdf>.*

Eric Rotenberg et al.; Trace Processors; 1997 IEEE; pp. 138-148; <http://ieeexplore.ieee.org/stamp/stamp.jsp?tp=&arnumber=645805>.*

Jeffrey C. Mogul et al.; Potential benefits of delta encoding and data compression for HTTP; 1997 ACM; pp. 181-194; <http://dl.acm.org/citation.cfm?id=263162>.*

* cited by examiner

|  | 201 | 202 |  |  |
|---|---|---|---|---|
| FU #0 | TD #0 | TD #0 |  | TD #0 |
| FU #1 | TD #1 | TD #1 |  | TD #1 |
| FU #2 | TD #2 | TD #2 |  | TD #2 |
| FU #3 | TD #3 | TD #3 | ... | TD #3 |
|  | ⋮ | ⋮ |  | ⋮ |
| FU #14 | TD #14 | TD #14 |  | TD #14 |
| FU #15 | TD #15 | TD #15 |  | TD #15 |
|  | cycle 0 | cycle 1 |  | cycle n |

APPARATUS AND METHOD FOR COMPRESSING TRACE DATA

CROSS-REFERENCE TO RELATED APPLICATION(S)

This application claims the benefit under 35 U.S.C. §119(a) of Korean Patent Application No. 10-2011-0005141, filed on Jan. 18, 2011, in the Korean Intellectual Property Office, the entire disclosure of which is incorporated herein by reference for all purposes.

BACKGROUND

1. Field

The following description relates to an apparatus and method for compressing trace data.

2. Description of the Related Art

Reconfigurable architectures are computer architectures whose hardware structures may be reconfigured to be optimized for each task.

Hardware processing may not be able to properly handle tasks due to an inherent inflexibility of hardware especially when the tasks are subject to modification. Software processing, unlike hardware processing, may be able to provide flexibility and adaptability to various tasks, but the speed of software processing is generally lower than the speed of hardware processing.

Reconfigurable architectures may provide the benefits of both hardware processing and software processing, and thus reconfigurable architectures have attracted an increasing amount of public attention, especially in the field of digital signal processing.

Various types of reconfigurable architectures are available. The various types include coarse-grained arrays (CGAs). A CGA includes a plurality of function units, and the CGA may be optimized for certain tasks by adjusting connections between the function units.

Trace data is memory access information corresponding to processing units. Since, in a CGA, each function unit operates independently, trace data is generated for each function unit. Thus, an amount of trace data increases according to a number of function units in a CGA.

SUMMARY

In one general aspect, an apparatus for compressing trace data is provided. The apparatus includes a detection unit configured to detect trace data corresponding to one or more function units, the function units performing a substantially significant operation in a reconfigurable processor as valid trace data, and a compression unit configured to compress the valid trace data.

The detection unit may be further configured to identify the one or more function units performing the substantially significant operation based on schedule information provided by a compiler of the reconfigurable processor and detect trace data corresponding to the identified function units as the valid trace data.

The schedule information may include at least one of identification information corresponding to one or more function units to which a no-operation (NOP) instruction is mapped and identification information corresponding to one or more function units to which a 'predicate' instruction for pipelining is mapped.

The detection unit may be further configured to identify one or more function units to which a NOP instruction is mapped and detect all the trace data, except for trace data corresponding to the identified function units, as the trace data corresponding to the one or more function units performing the substantially significant operation.

The detection unit may be further configured to identify one or more function units to which a 'predicate' instruction for pipelining is mapped and detect all the trace data, except for trace data corresponding to the identified function units, as the trace data corresponding to the one or more function units performing the substantially significant operation.

The compression unit may be further configured to generate additional information corresponding to a detection of the valid trace data and to generate compressed trace data by compressing both the valid trace data and the additional information.

The compression unit may be further configured to generate the compressed trace data for each configuration information or each execution cycle of the reconfigurable processor.

The additional information may include at least one of a count value of a program counter of the reconfigurable processor, identification information corresponding to one or more function units currently operating, identification information corresponding to other function units currently not operating, schedule information provided by a compiler of the reconfigurable processor, and compression type information. The 'predicate' instruction may be an instruction with no specific function used in one of a prologue stage before a kernel stage of the pipelining and an epilogue stage after the kernel stage of the pipelining.

The detection unit and the compression unit each is implemented by a processor.

In another general aspect, a method of compressing trace data is provided. The method includes detecting trace data corresponding to one or more function units performing a substantially significant operation in a reconfigurable processor as valid trace data, and compressing the valid trace data.

The detecting the valid trace data may include identifying the one or more function units performing the substantially significant operation based on schedule information provided by a compiler of the reconfigurable processor and detecting trace data corresponding to the identified function units as the valid trace data.

The detecting the valid trace data may include identifying one or more function units to which a NOP instruction is mapped and detecting all the trace data, except for trace data corresponding to the identified function units, as the trace data corresponding to the one or more function units performing the substantially significant operation.

The detecting the valid trace data may include identifying one or more function units to which a 'predicate' instruction for pipelining is mapped and detecting all the trace data, except for trace data corresponding to the identified function units, as the trace data corresponding to the one or more function units performing the substantially significant operation.

The compressing the valid trace data may include generating additional information corresponding to a detection of the valid trace data and generating compressed trace data by compressing both the valid trace data and the additional information.

The 'predicate' instruction may be an instruction with no specific function used in one of a prologue stage before a kernel stage of the pipelining and an epilogue stage after the kernel stage of the pipelining.

In another general aspect, an apparatus for compressing trace data is provided. The apparatus includes one or more function units performing any of a substantially significant operation, a no-operation instruction, and a 'predicate' instruction, a detection unit configured to detect trace data corresponding to the one or more function units performing the substantially significant operation in a reconfigurable processor as valid trace data, and a compression unit configured to compress the valid trace data. The detection unit may be configured to exclude trace data corresponding to the one or more function units performing the no-operation instruction and the 'predicate' instruction.

In another general aspect, a method of compressing trace data is provided. The method includes performing any of a substantially significant operation, a no-operation instruction, and a 'predicate' instruction by one or more function units, detecting trace data corresponding to the one or more function units performing the substantially significant operation in a reconfigurable processor as valid trace data, and compressing the valid trace data. The detecting excludes trace data corresponding to the one or more function units performing the no-operation instruction and the 'predicate' instruction, and the detecting and the compressing each is performed by a processor.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist a reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Examples of an apparatus and method for compressing trace data can be applied to a reconfigurable processor. A reconfigurable processor includes a plurality of function units which can process tasks or instructions independently of one another. Examples of the apparatus and method for compressing trace data may selectively compress only significant or valid trace data, among other trace data.

Figure 1:
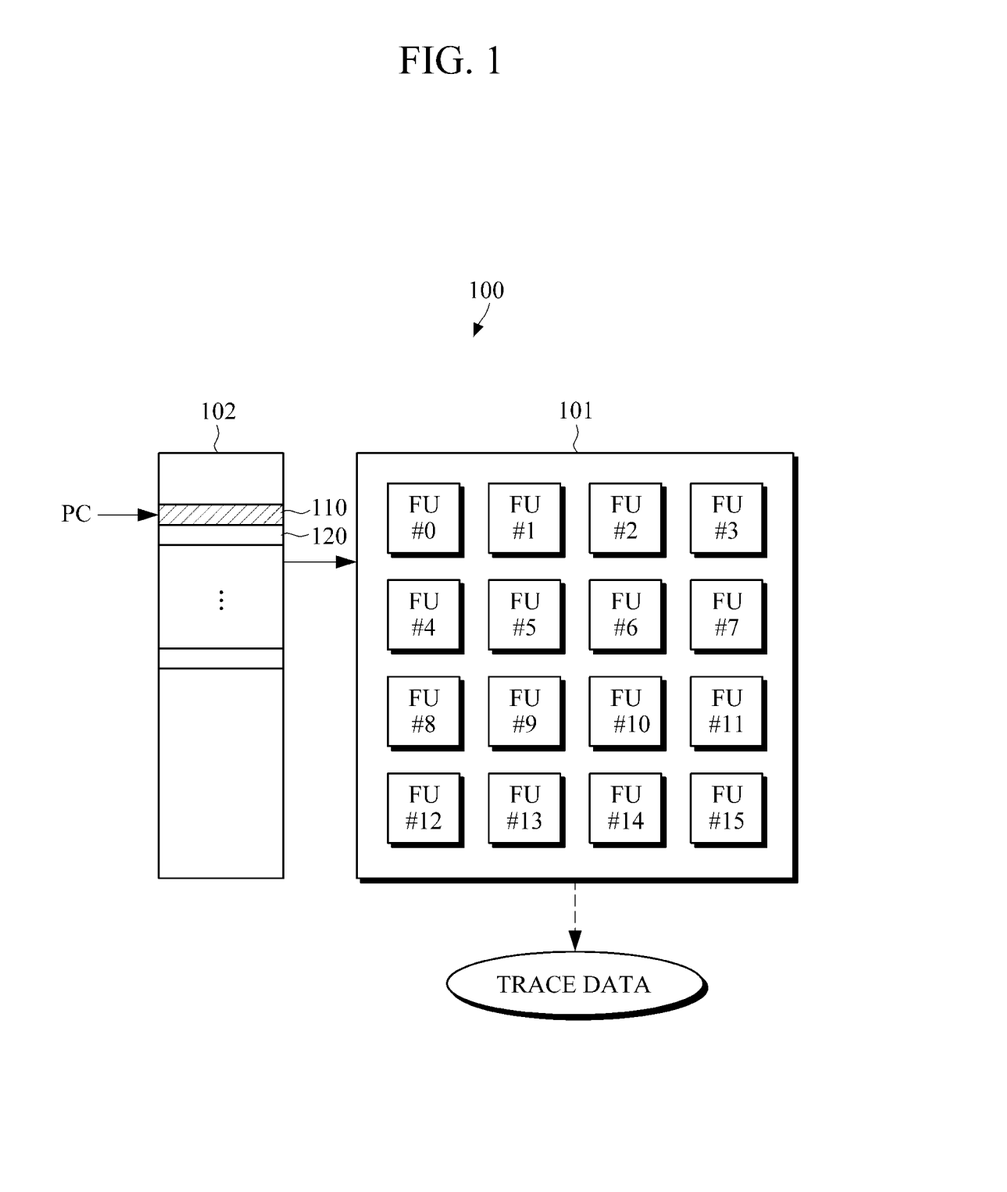
FIG. 1 is a diagram illustrating an example of a reconfigurable processor.

FIG. 1 illustrates an example of a reconfigurable processor.

Referring to FIG. 1, a reconfigurable processor 100 includes a processor 101 and a configuration memory 102.

The processor 101 includes a plurality of function units (for example, FU #0 through FU #15). The function units FU #0 through FU #15 may process tasks or instructions independently of one another. For example, the processor 101 may process tasks in parallel using the function units FU #0 through FU #15, which operate independently. Each of the function units FU #0 through FU #15 may include a processing element, which may perform arithmetic/logic operations, and a register file, which may temporarily store results of the arithmetic/logic operations.

The configuration memory 102 may store configuration information related to the processor 101. The configuration information may include instruction information corresponding to instructions allocated to each of the function units FU #0 through FU #15 and connection information corresponding to the connections between the function units FU #0 through FU #15. Since the configuration information defines the instructions allocated to each of the function units FU #0 through FU #15 and the connections between the function units FU #0 through FU #15, the instructions allocated to each of the function units FU #0 through FU #15 and the connections between the function units FU #0 through FU #15 may be changed based on the configuration information.

For example, if a program counter PC points to first configuration information 110, instruction A may be mapped to the function unit FU #0 and an output port of the function unit FU #0 may be connected to an input port of the function unit FU #4 according to the first configuration information 110. If the program counter PC points to second configuration information 120, instruction B may be mapped to the function unit FU #0 and the output port of the function unit FU #0 may be connected to an input port of the function unit FU #5 according to the second configuration information 120.

The reconfigurable processor 100 may be optimized for a task according to configuration information pointed to by the program counter PC and may then perform the task.

The reconfigurable processor 100 may generate trace data corresponding to the configuration information. The trace data may be memory access information corresponding to each of the function units FU #0 through FU #15. For example, the trace data may indicate what part of a memory or what data in the memory has been accessed by each of the function units FU #0 through FU #15 when executing instructions.

The trace data may include not only access information corresponding to the configuration memory 102 but also access information corresponding to other memories (not shown). If the reconfigurable processor 100 is a coarse-grained array (CGA), the trace data may include access information corresponding to a CGA instruction memory or a CGA data memory. If the reconfigurable processor 100 has two execution modes, for example, a very-long-instruction-word (VLIW) mode and a CGA mode, the trace data may include access information corresponding to a central register file that stores context at a time of mode switching.

Figure 2:
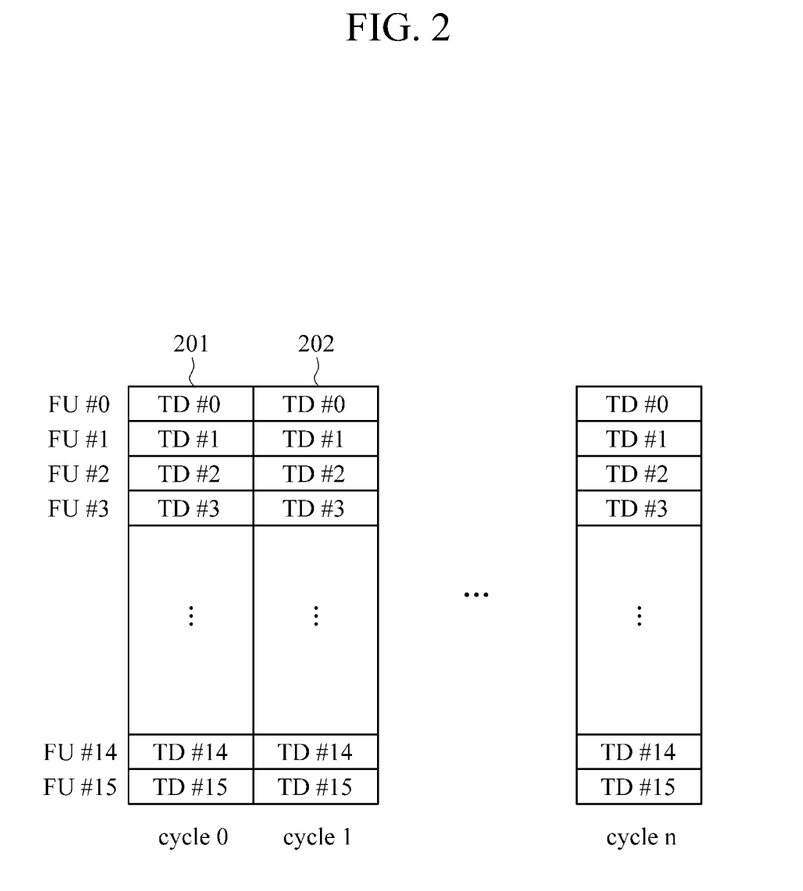
FIG. 2 is a diagram illustrating an example of trace data.

FIG. 2 illustrates an example of trace data.

Referring to FIGS. 1 and 2, trace data may be generated for each configuration information or each execution cycle of the reconfigurable processor 100. For example, if the program counter PC points to the first configuration information 110, for example, during cycle 0, a first trace data group 201 may be generated. Trace data TD #0 in the first trace data group 201 may be trace data corresponding to the function unit FU #0. In a case in which the program counter PC points to the second configuration information 120, for example, during cycle 1, a second trace data group 202 may be generated.

Each of the first and second trace data groups 201 and 202 may include non-significant trace data. For example, if, during cycle 0, the function unit FU #0 executes a no-operation (NOP) instruction according to the first configuration information 110, the trace data TD #0 corresponding to the function unit FU #0 may include irrelevant information.

An example of an apparatus for compressing trace data may select from all trace data corresponding to the function units FU #0 through FU #15, only valid trace data, for example, trace data corresponding to one or more currently-operating function units among the function units FU #0 through FU #15, and the apparatus may compress the selected trace data.

Figure 3:
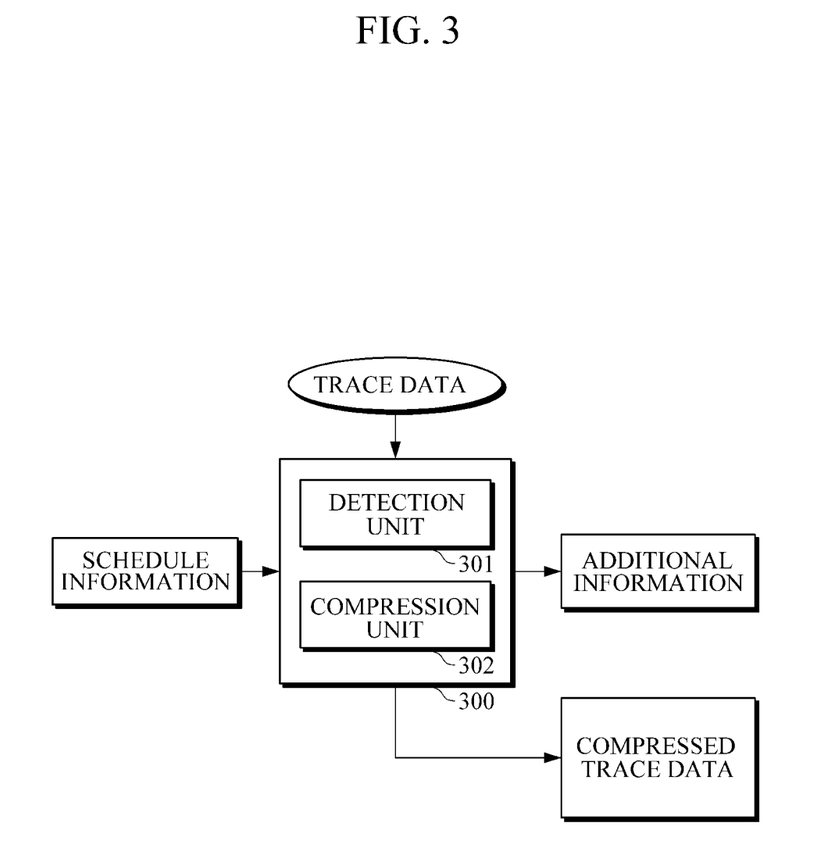
FIG. 3 is a diagram illustrating an example of an apparatus for compressing trace data.

FIG. 3 illustrates an example of an apparatus for compressing trace data.

Referring to FIGS. 1 and 3, an apparatus 300 for compressing trace data includes a detection unit 301 and a compression unit 302.

The detection unit 301 receives trace data corresponding to each of the function units FU #0 through FU #15 of the reconfigurable processor 100. For example, the detection unit 301 may receive the trace data shown in FIG. 2.

The detection unit 301 detects valid trace data, which is trace data corresponding to any function unit performing a substantially significant operation, from the received trace data. For example, the detection unit 301 may identify any function unit operating in each execution cycle and may detect trace data corresponding to the identified operating function units as the valid trace data.

Function units performing a substantially significant operation may be identified based on schedule information provided by a compiler (not shown) of the reconfigurable processor 100. The schedule information may indicate one or more instructions mapped to each of the function units FU #0 through FU #15 for each configuration information or for each execution cycle. For example, the detection unit 301 may detect all the received trace data, except for trace data corresponding to any function unit to which a no-operation (NOP) instruction is mapped and/or trace data corresponding to any function unit to which a 'predicate' instruction is mapped, as valid trace data.

A NOP instruction and a 'predicate' instruction may be instructions with no specific functions. The 'predicate' instruction may be an instruction with no specific function used 1) in a prologue stage before a kernel stage of software pipelining or 2) in an epilogue stage after the kernel stage. Various other instructions with no specific functions may be mapped to the function units FU #0 through FU #15 according to various compiling policies. The detection unit 301 may identify the instruction(s) mapped to each of the function units FU #0 through FU #15 based on the schedule information provided by the compiler.

The compression unit 302 may compress the valid trace data detected by the detection unit 301. In this manner, the apparatus 300 can selectively compress only valid data among other trace data. The compression unit 302 may generate compressed trace data by compressing valid trace data for each configuration information or each execution cycle of the reconfigurable processor 100.

The compression unit 302 may generate additional information related to the detection of valid trace data, and may generate compressed trace data by compressing not only the valid trace data but also the generated additional information. The generated additional information may include a count value of the program counter PC of the reconfigurable processor 100, identification information corresponding to currently-operating function units, identification information corresponding to currently-not-operating function units, the schedule information provided by the compiler of the reconfigurable processor 100, and compression type information. For example, the generated additional information may indicate what configuration information is associated with the valid trace data and which of the function units FU #0 through FU #15 perform a substantially significant operation.

Figure 4:
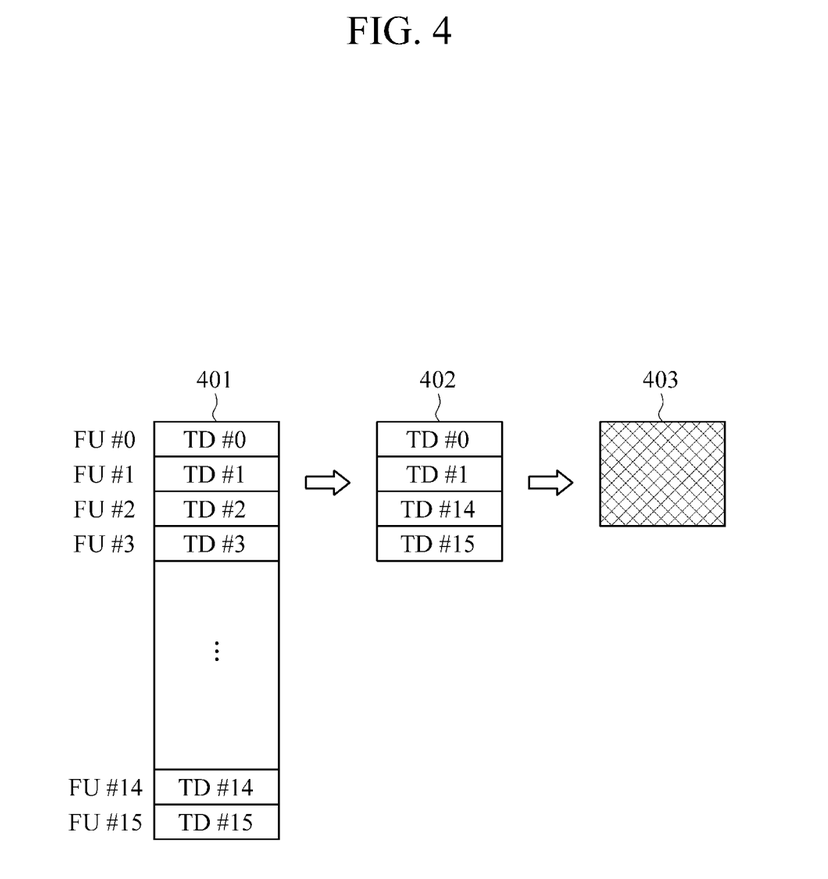
FIG. 4 is a diagram illustrating an example of valid trace data.

FIG. 4 illustrates an example of valid trace data.

Referring to FIGS. 1, 3, and 4, the detection unit 301 may receive an entire group 401 of trace data TD #0 through TD #15 respectively corresponding to the function units FU #0 through FU #15. The trace data group 401 may include both trace data corresponding to function units performing a substantially significant operation and trace data corresponding to function units not performing a substantially significant operation.

The detection unit 301 may receive schedule information from the compiler of the reconfigurable processor 100. The detection unit 301 may determine which of the function units FU #0 through FU #15 are mapped with a NOP or 'predicate' instruction based on the received schedule information. If the received schedule information indicates that a NOP instruction is mapped to each of the function units FU #2 through FU #13, the detection unit 301 may determine trace data TD #2 through TD #13 corresponding to the function units FU #2 through FU #13, respectively, as invalid trace data, and may determine trace data TD #0, TD #1, TD #14, and TD #15 corresponding to the function units FU #0, FU #1, FU #14, and FU #15, respectively, as valid trace data 402.

The compression unit 302 may generate compressed valid trace data 403 by compressing the valid trace data detected by the detection unit 301.

The compressed valid trace data 403 may include only the valid trace data detected by the detection unit 301 and thus may be much smaller in size than the trace data group 401.

Figure 5:
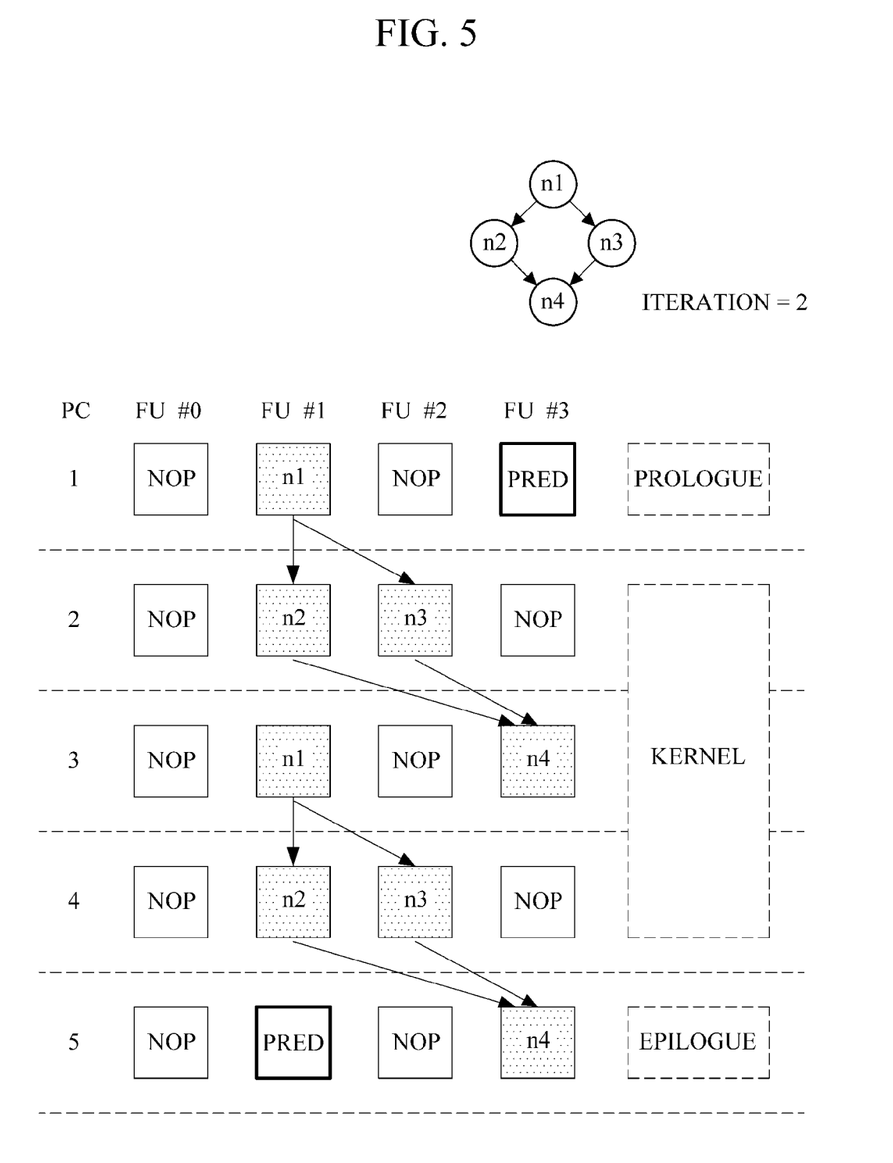
FIG. 5 is a diagram illustrating an example of a method of detecting valid trace data.

FIG. 5 illustrates an example of a method of detecting valid trace data.

Referring to FIG. 5, nodes n1 through n4 may represent instructions or data to be executed by the reconfigurable processor 100. Assuming that there is a program having executable instruction n1, executable instructions n2 and n3, which have a parallel relationship and can thus be executed together in parallel, based on the results of the execution of instruction n1, and executable instruction n4 based on the results of the execution of instructions n2 and n3, and that the execution of instructions n1, n2, n3, and n4 is performed twice.

Referring to FIGS. 1, 3, and 5, if the count value of the program counter PC of the reconfigurable processor 100 is 1, configuration information #1 may be loaded, and the prologue stage of software pipelining may be performed. For example, during a first execution cycle, the function unit FU #1 may execute node n1. In this case, the detection unit 301 may identify, from schedule information provided by the compiler of the reconfigurable processor 100, that a NOP instruction is mapped to each of the function units FU #0 and #2, and that a 'predicate' instruction is mapped to the function unit FU #3. Thus, the detection unit 301 may detect the trace data corresponding to the function unit FU #1, but not the trace data corresponding to the function units FU #0, FU #2, and FU #3, as valid trace data.

If the count value of the program counter PC of the reconfigurable processor 100 is 2, configuration information #2 may be loaded, and the kernel stage of software pipelining may be performed. For example, during a second execution cycle, the function units FU #1 and FU #2 may execute node n2 and node n3, respectively. In this case, the detection unit 301 may identify, based on the schedule information provided by the compiler of the detection unit 301, that a NOP instruction is mapped to each of the function units FU #0 and FU #3. Thus, the detection unit 301 may detect the trace data corresponding to the function units FU #1 and FU #2, but not the trace data corresponding to the function units FU #0 and FU #3, as valid trace data.

If the count value of the program counter PC of the reconfigurable processor 100 is 3, configuration information #3 may be loaded, and the kernel stage of software pipelining may be performed. For example, during a third execution cycle, the function unit FU #1 may execute node n1 again, for example, according to loop iteration, and the function unit FU #3 may execute node n4. Also, if the count value of the program counter PC is 3, node n1 may correspond to a second iteration of the program. In this case, the detection unit 301 may identify, based on the schedule information provided by the compiler of the detection unit 301, that a NOP instruction is mapped to each of the function units FU #0 and FU #2. Thus, the detection unit 301 may detect the trace data corresponding to the function units FU #1 and FU #3, but not the trace data corresponding to the function units FU #0 and FU #2, as valid trace data.

Figure 6:
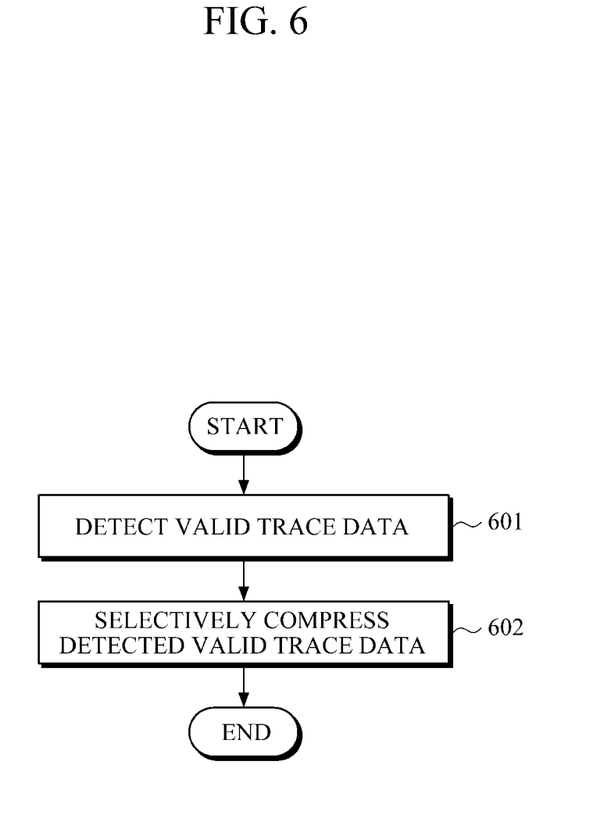
FIG. 6 is a flowchart illustrating an example of a method of compressing trace data.

FIG. 6 illustrates an example of a method of compressing trace data.

Referring to FIGS. 3 and 6, the apparatus 300 detects valid trace data from all trace data available (601). For example, referring to FIG. 5, the detection unit 301 may determine which of the function units FU #0 through FU #15 are mapped with a NOP or 'predicate' instruction based on schedule information, and may detect trace data corresponding to the function units FU #0 through FU #15 that are not mapped with a NOP or 'predicate' instruction as valid trace data.

Once valid trace data is detected, the apparatus 300 compresses the detected valid trace data (602). For example, the compression unit 302 may generate additional information corresponding to the valid trace data and may generate compressed trace data by compressing both the valid trace data and the generated additional information.

As described above, it is possible to reduce the amount of trace data by selectively compressing only trace data corresponding to function units performing a substantially significant operation, instead of compressing all trace data available.

In addition, it is possible to effectively debug a reconfigurable processor, by analyzing not only the compressed valid trace data but also the compressed additional information corresponding to the valid trace data, after decompressing the compressed valid trace data and the compressed additional information.

The processes, functions, methods and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of compressing trace data, comprising:
detecting trace data corresponding to one or more function units performing an instruction in a reconfigurable processor as valid trace data, to exclude at least one of a no-operation (NOP) instruction and a predicate instruction for pipelining; and
compressing the valid trace data for each configuration information without compressing the configuration information, wherein the detecting and the compressing each is performed by a processor,
wherein the trace data comprises memory access information corresponding to each of the function units, and corresponding to configuration information related to the processor, excluding the data accessed using the memory access information, and
wherein the configuration information defines instructions allocated to the function units and connections between the function units, and
wherein the compressing the valid trace data comprises generating additional information corresponding to a detection of the valid trace data and generating compressed trace data by compressing both the valid trace data and the additional information.

2. The method of claim 1, wherein the detecting the valid trace data comprises identifying one or more function units to which a NOP instruction is mapped and detecting all the trace data, except for trace data corresponding to the identified function units, as the trace data corresponding to the one or more function units performing the instruction.

3. The method of claim 1, wherein the detecting the valid trace data comprises identifying one or more function units to which a predicate instruction for pipelining is mapped and detecting all the trace data, except for trace data corresponding to the identified function units, as the trace data corresponding to the one or more function units performing the instruction.

4. The method of claim 3, wherein the predicate instruction is an instruction with no specific function used in one of a prologue stage before a kernel stage of the pipelining and an epilogue stage after the kernel stage of the pipelining.

5. The method of claim 1, wherein the detecting the valid trace data comprises identifying the one or more function units performing the instruction based on schedule information provided by a compiler of the reconfigurable processor and detecting trace data corresponding to the identified function units as the valid trace data.

6. An apparatus having a processor for compressing trace data, comprising:
- one or more function units performing any of a no-operation instruction, a predicate instruction, and another instruction;
- a detector configured to detect trace data corresponding to the one or more function units performing the other instruction in a reconfigurable processor as valid trace data; and
- a compressor configured to compress the valid trace data for each configuration information without compressing the configuration information, wherein the detector is configured to exclude trace data corresponding to the one or more function units performing the no-operation instruction and the predicate instruction,
- wherein the trace data comprises memory access information corresponding to each of the function units and corresponding to configuration information related to the processor, excluding the data accessed using the memory access information, and
- wherein the configuration information defines instructions allocated to the function units and connections between the function units, and
- wherein the compressor is further configured to generate additional information corresponding to a detection of the valid trace data and to generate compressed trace data by compressing both the valid trace data and the additional information.

7. A method of compressing trace data, comprising:
- performing any of a no-operation instruction, a predicate instruction, and another instruction by one or more function units;
- detecting trace data corresponding to the one or more function units performing the other instruction in a reconfigurable processor as valid trace data; and
- compressing the valid trace data for each configuration information without compressing the configuration information, wherein:
  - the detecting excludes trace data corresponding to the one or more function units performing the no-operation instruction and the predicate instruction; and
  - the detecting and the compressing each is performed by a processor,
- wherein the trace data comprises memory access information corresponding to each of the function units and corresponding to configuration information related to the processor, excluding the data accessed using the memory access information, and
- wherein the configuration information defines instructions allocated to the function units and connections between the function units, and
- wherein the compressing the valid trace data comprises generating additional information corresponding to a detection of the valid trace data and generating, compressed trace data by compressing both the valid trace data and the additional information.

8. An apparatus having a processor for compressing trace data, comprising:
- a detector configured to detect trace data corresponding to one or more function units performing an instruction in a reconfigurable processor as valid trace data, to exclude at least one of a no-operation (NOP) instruction and a predicate instruction for pipelining; and
- a compressor configured to compress the valid trace data for each configuration information without compressing the configuration information,
- wherein the trace data comprises memory access information corresponding to each of the function units and corresponding to configuration information related to the processor, excluding the data accessed using the memory access information, and
- wherein the configuration information defines instructions allocated to the function units and connections between the function units, and
- wherein the compressor is further configured to generate additional information corresponding to a detection of the valid trace data and to generate compressed trace data by compressing both the valid trace data and the additional information.

9. The apparatus of claim 8, wherein the detector is further configured to identify one or more function units to which a NOP instruction is mapped and detect all the trace data, except for trace data corresponding to the identified function units, as the trace data corresponding to the one or more function units performing the instruction.

10. The apparatus of claim 8, wherein the detector is further configured to identify one or more function units to which a predicate instruction for pipelining is mapped and detect all the trace data, except for trace data corresponding to the identified function units, as the trace data corresponding to the one or more function units performing the instruction.

11. The apparatus of claim 8, wherein the additional information comprises at least one of a count value of a program counter of the reconfigurable processor, identification information corresponding to one or more function units currently operating, identification information corresponding to other function units currently not operating, schedule information provided by a compiler of the reconfigurable processor, and compression type information.

12. The apparatus of claim 8, wherein the detector and the compressor each is implemented by the processor.

13. The apparatus of claim 8, wherein the generated additional information indicates which of the function units perform an operation to exclude at least one of a no-operation (NOP) instruction and a predicate instruction.

14. The apparatus of claim 8, wherein the detector is further configured to identify the one or more function units performing the instruction based on schedule information provided by a compiler of the reconfigurable processor and detect trace data corresponding to the identified function units as the valid trace data.

15. The apparatus of claim 14, wherein the schedule information comprises at least one of identification information corresponding to one or more function units to which at least one of a no-operation (NOP) instruction is mapped and identification information corresponding to one or more function units to which a predicate instruction for pipelining is mapped.

16. The apparatus of claim 15, wherein the predicate instruction is an instruction with no specific function used in one of a prologue stage before a kernel stage of the pipelining and an epilogue stage after the kernel stage of the pipelining.

* * * * *